(12) United States Patent
Sarathy

(10) Patent No.: US 6,777,252 B2
(45) Date of Patent: Aug. 17, 2004

(54) METHOD AND APPARATUS FOR TESTING AN INDIVIDUAL LIGHTWAVE CHIP ON A WAFER

(75) Inventor: Jiten Sarathy, Atlantic Highlands, NJ (US)

(73) Assignee: Alphion Corporation, Eatontown, NJ (US)

( * ) Notice: Subject to any disclaimer, the term of this patent is extended or adjusted under 35 U.S.C. 154(b) by 0 days.

(21) Appl. No.: 10/441,330

(22) Filed: May 20, 2003

(65) Prior Publication Data

US 2003/0219915 A1 Nov. 27, 2003

Related U.S. Application Data

(60) Provisional application No. 60/382,932, filed on May 24, 2002.

(51) Int. Cl.[7] ........................ H01L 21/66; G01R 31/26
(52) U.S. Cl. ........................ 438/14; 438/16; 438/7
(58) Field of Search ................... 359/122, 344; 385/11, 24–30; 438/4–18

(56) References Cited

U.S. PATENT DOCUMENTS 4,188,123 A * 2/1980 Kleinknecht ................. 356/521
5,485,540 A * 1/1996 Eda ............................. 385/129

* cited by examiner

Primary Examiner—Caridad Everhart
Assistant Examiner—Calvin Lee
(74) Attorney, Agent, or Firm—Kaplan & Gilman, LLP

(57) ABSTRACT

A method of efficiently testing optical chips while still on the wafer is presented. One or more gutters for each chip on the wafer is provided, and either (1) a test signal is applied to the gutter to generate a response from the chip; or (2) a test signal is applied to the chip to generate a response from the gutter, where the gutter is in optical communication with the chip, and can reflect light incident or outgoing light at substantially a ninety degree angle.

9 Claims, 5 Drawing Sheets

Top View of Chip and Gutter

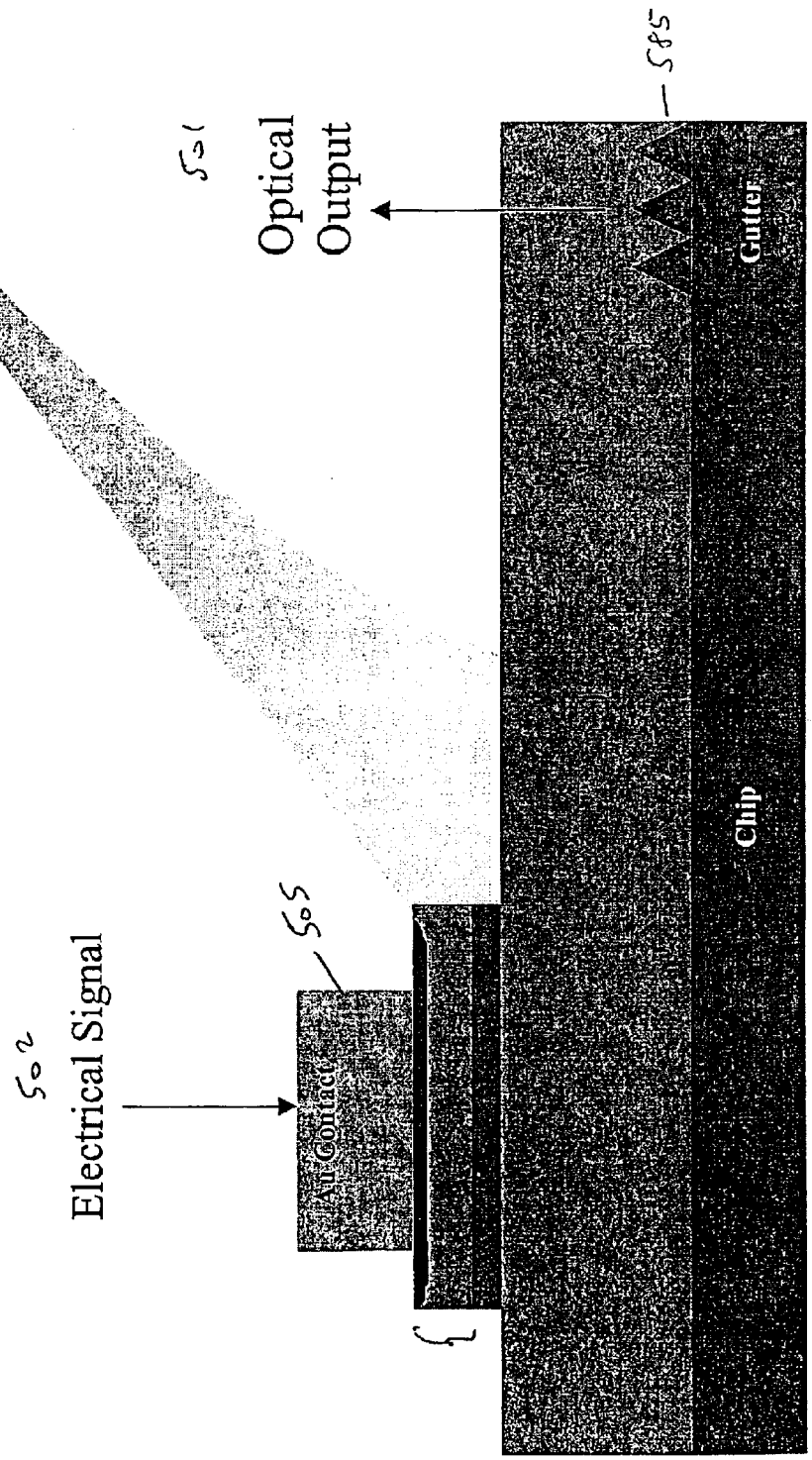

METHOD AND APPARATUS FOR TESTING AN INDIVIDUAL LIGHTWAVE CHIP ON A WAFER

CROSS REFERENCE TO OTHER APPLICATIONS

This application claims the benefit of U.S. Provisional Patent Application Serial No. 60/382,932, filed on May 24, 2002.

TECHNICAL FIELD

This invention relates to the fabrication of optical chips and optical integrated circuits. More particularly, the invention relates to the testing of optical semiconductor chips while still in the wafer.

BACKGROUND OF THE INVENTION

Optical integrated circuits are fabricated on semiconductor chips. In the fabrication process, numerous chips are created on a wafer, generally a circular disk of some semiconductor material. The wafer comprises an array of individual chips 101, demarcated by cleave marks 110, as shown in FIG. 1. Light enters and leaves each chip from its edge(s), where the direction of light is in the plane of the wafer. Thus, the regions on an individual chip where light enters and exits the chip, i.e. its edge(s), are obstructed by the neighboring chip(s) while a chip is still uncleaved and in the wafer. Therefore, conventionally, edge-emitting or edge-coupled chips must be first cleaved and facet-coated before they can be optically probed for testing. If the chip does not work, then the cleaving and facet-coating steps represent lost effort.

Such lost effort is not trivial in any sense. Commonly a certain proportion of chips on a wafer are faulty in some way, and do not operate, or do not operate according to required specifications. The proportion of chips that do operate satisfactorily is usually referred to as the yield. There is an inverse relationship between the yield and the wasted effort of cleaving and testing substandard chips. Yields less than 0.5 being common in numerous fabrication processes for simple optical devices, and even substantially lower yields when complex optical integrated circuit chips are being fabricated, what is needed is a method and apparatus that allows optical testing of a chip without requiring that the chip be first cleaved and facet coated.

SUMMARY OF THE INVENTION

A method of efficiently testing optical chips while still on the wafer is presented. One or more gutters for each chip on the wafer is provided, and either (1) a test signal is applied to the gutter to generate a response from the chip; or (2) a test signal is applied to the chip to generate a response from the gutter, where the gutter is in optical communication with the chip, and can reflect light incident or outgoing light at substantially a ninety degree angle.

BRIEF DESCRIPTION OF THE DRAWINGS

FIG. 5 depicts a side view of one chip and its gutter with an optical input and electrical output.

DETAILED DESCRIPTION OF THE PREFERRED EMBODIMENTS

Figure 1:
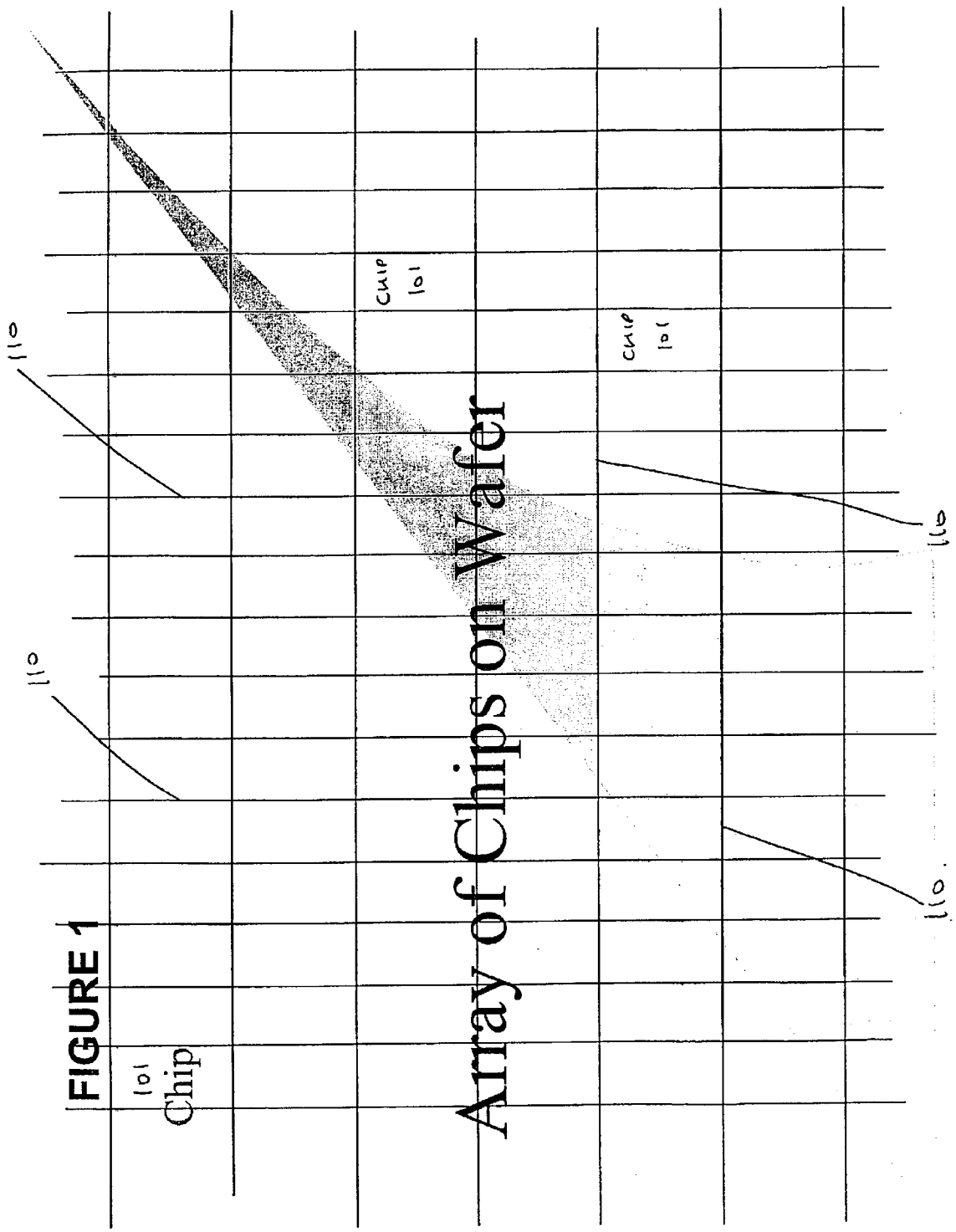
FIG. 1 depicts a conventional array of chips on a wafer.

The above described problems of the conventional art are solved in accordance with the method and apparatus of the present invention. A novel method for testing the optical properties of an individual chip on a wafer is presented. Before one or more embodiments of the invention are explained in detail, it is to be understood that the invention is not limited in its application to the details of construction or the arrangements of components set forth in the following description or illustrated in the drawings (the terms "construction" and "components" being understood in the most general sense and thus referring to and including, in appropriate contexts, methods, algorithms, processes and subprocesses). The invention is capable of other embodiments and of being practiced or being carried out in various ways. Also, it is to be understood that the phraseology and terminology used herein is for the purposes of description and should not be regarded as in any way limiting.

Figure 2:
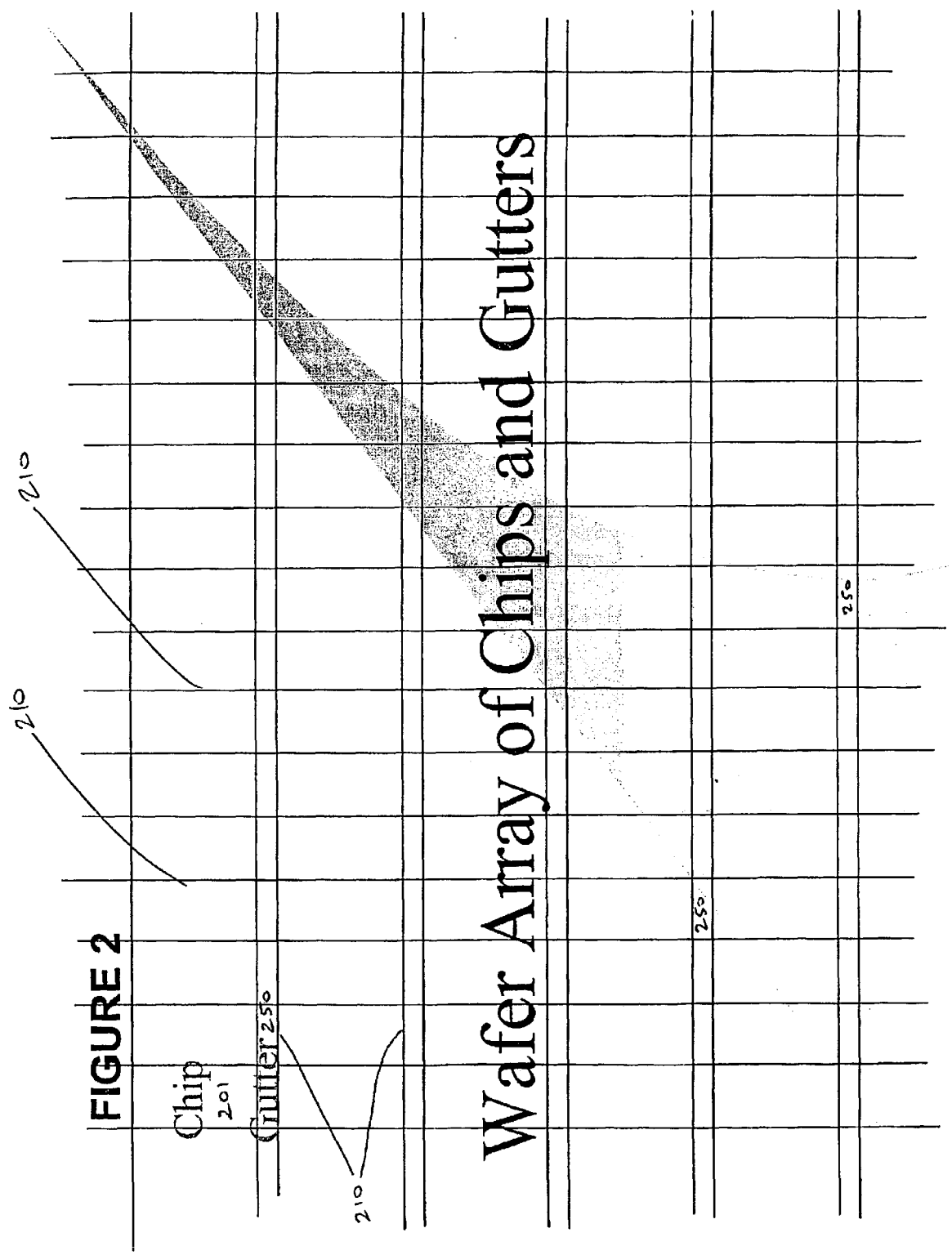
FIG. 2 depicts the array of FIG. 1 with the added features of the present invention.

The solution according to the present invention is to place a gutter in between each chip and its neighbors, as depicted in FIG. 2. With reference to FIG. 2, a row of gutters 250 is provided adjacent to each row of chips 201. The cleave marks 210 are represented as the vertical and horizontal lines in the Figure, as in FIG. 1. In the wafer of FIG. 2 there are also cleave marks between the gutters and the two rows of chips adjacent thereto. It is noted that in the chip type represented in FIG. 2 optical signals enter and leave the chip only along the vertical direction, and only through one vertical edge of the chip. Thus gutters are only needed along one of the horizontal edges of the chips. In alternative embodiments of the invention gutters can be provided along any and every edge of the chip that would require optical signal ingress and egress.

Figure 3:
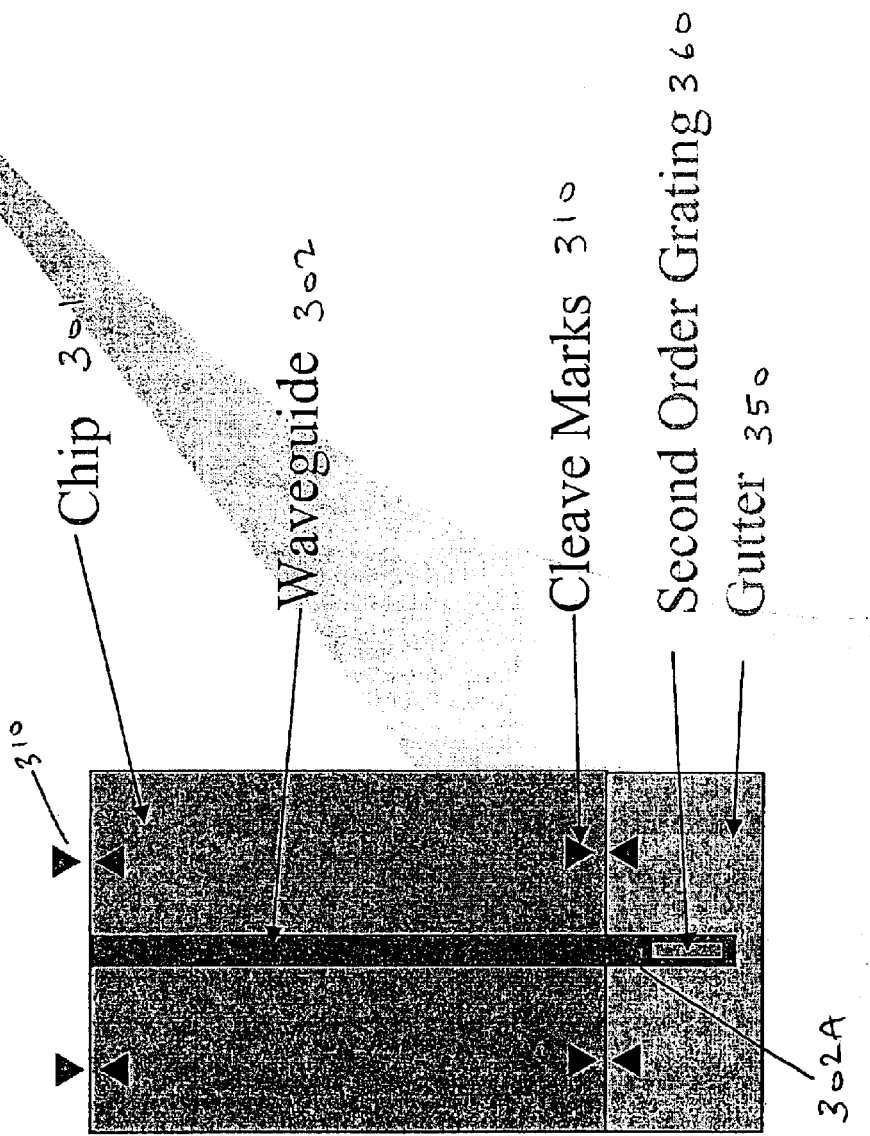
FIG. 3 depicts a top view of one chip and its gutter according to the present invention.

FIG. 3 depicts a top view of a single chip and its adjacent gutter. It is understood that this is merely for illustration purposes, and that according to the method of the present invention the gutter is utilized prior to cleaving of the chip from the wafer. The waveguide 302 from the chip 301 flows into the waveguide 302A in the gutter 350, which comprises a region with a second order reflection grating 360. The cleave marks 310 in both the chip and the gutter are depicted as well, and corresponding to the cleave marks lines 210 as shown in FIG. 2.

At a probe station, a worker can shine light down onto the grating, the incident light being normal to the surface of the wafer, and propagating in the direction coming into the page of FIG. 3.

Figure 4:
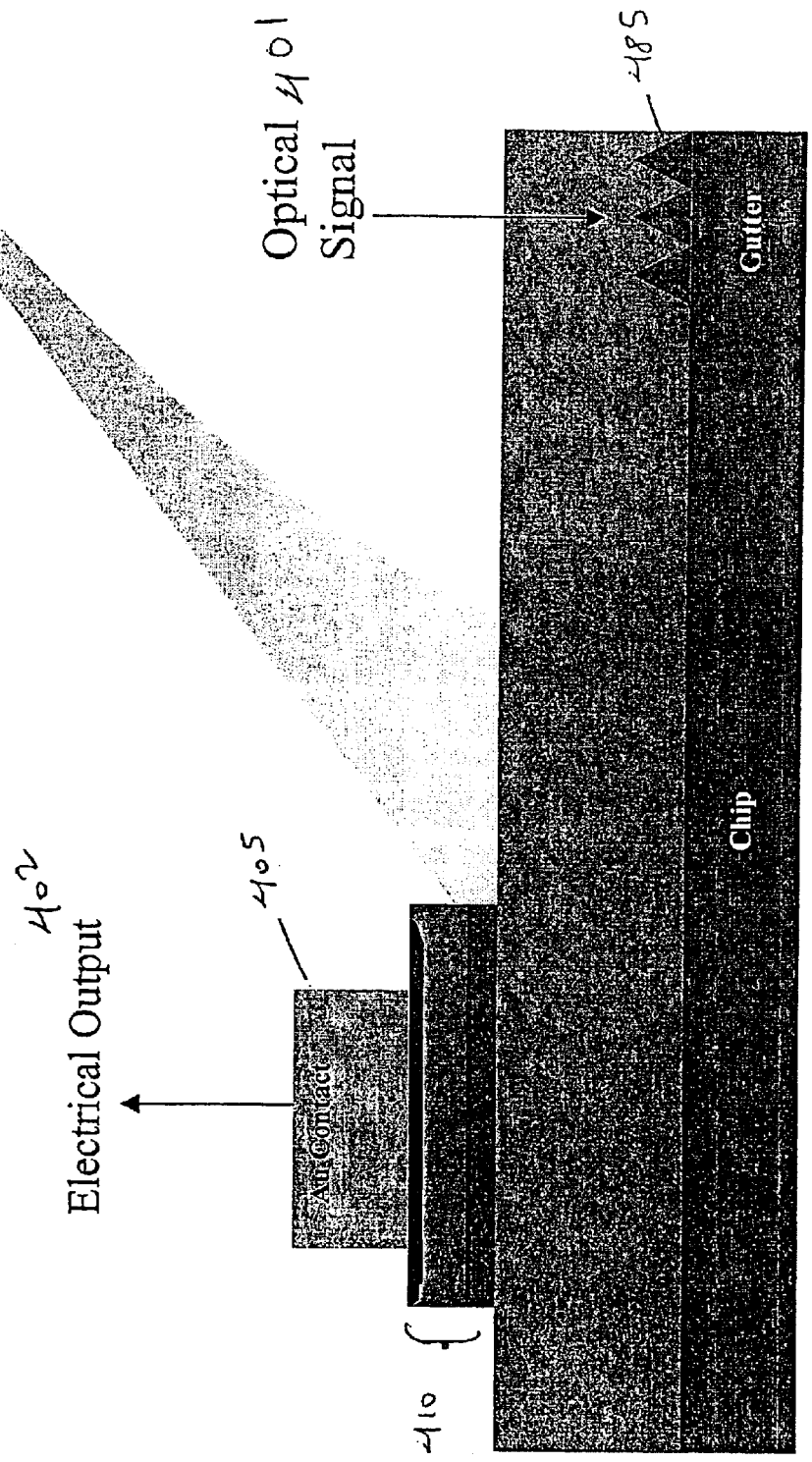
FIG. 4 depicts a side view of one chip and its gutter with an optical input and electrical output.

With reference to FIG. 4, light from such a probe signal 401 will be reflected at a 90 degree angle by the reflection grating 485 located in the gutter 480 into the neighboring chip 470. The optical probe signal will cause an electrical output 402 or photocurrent through a metallic contact 405 (made of gold in the depicted embodiment) which is electrically connected to an absorption region 410 which converts the optical signal into an electrical one. The photocurrent 402 thus generated can then be measured, thus providing a means to measure the signal power, as well as measures of input power to output power, transfer function of the device, and other useful optical chip testing metrics as may be known in the art.

Alternatively, the above description can be reversed if the waveguide device being fabricated on the chip is one that emits light, an example of which is depicted in FIG. 5. At a probe station, a worker can provide an electrical signal 502 by feeding current into an electrode electrically connected to a portion of the chip, such as a semiconductor laser, which converts electrical energy into optical energy. The current will generate incoherent light (ASE noise). Some of the generated light will be guided along the waveguide into the gutter 580 and be reflected at an angle of 90 degrees by the grating 585 to exit the device as an optical output 501 in a direction normal to the wafer and heading upwards out of the wafer into a photo-detector (not shown). The photodetector (not shown) is then utilized to measure the power and characteristics of the emitted light.

If the chip passes the electrical/optical test performed while still in the wafer via the gutter, the chip will be cleaved from the gutter and sent to the next stage of processing (including, but not limited to, facet coating). If the chip fails the test, then both the chip and the gutter will be discarded, thus not wasting resources on cleaving the chip and performing further processing thereon.

In alternative embodiments, there need not be a chip/gutter ratio of 1:1. Using appropriate gratings incident light will be reflected at 90 degrees thereto in both directions, thus allowing a gutter to serve two chips, i.e., a chip/gutter ratio of 2:1, assuming, as in the case of FIGS. 4 and 5, that light enters or exits through one port of the chip. As well, depending upon the context, there may be gutters on all four faces of a chip, as opposed to just two.

While the above describes the preferred embodiments of the invention, various modifications or additions will be apparent to those of skill in the art. Such modifications and additions are intended to be covered by the following claims.

What is claimed:

1. A method for testing one of plurality of optical chips formed on a surface of a wafer, comprising:

providing a gutter in optical communication with said chip for reflecting an light at a substantially ninety degree angle whereby an optical test signal is applied to said gutter in a direction substantially normal to said surface to generate a responsive electrical signal in the chip, or an optical signal responsive to an electrical test signal applied to said chip is reflected to leave said gutter in a direction substantially normal to said surface.

2. The method of claim 1, wherein said optical signal propagates in said chip along a direction parallel to said surface of the chip.

3. The method of claim 2, wherein said reflecting is realized by means of a grating provided in said gutter.

4. The method of claim 2, wherein said gutter is provided at one edge of said chip.

5. The method of claim 4, wherein said gutter is provided at a cleave between said chip and its neighboring chip.

6. A method of efficiently testing optical chips while still on a surface of the wafer, comprising:

providing at least one gutter for a chip on the wafer that is to be tested, said gutter being in optical communication with the chip for reflecting light from a first direction substantially normal to said surface of the wafer to a second direction substantially parallel to said surface, and vice versa, applying an optical test signal to the gutter in said first direction such that said optical test signal is reflected to propagate in said chip in said second direction so as to generate a responsive electrical signal, or applying an electrical test signal to said chip to generate a responsive optical signal propagating in said chip in said second direction such that said responsive optical signal is reflected by said gutter to leave said chip in said first direction.

7. The method of claim 6, wherein said electrical test signal is input to a light emitting chip to generate said responsive optical signal.

8. The method of claim 6, wherein said gutter is provided at a cleave between said chip and an adjacent chip.

9. The method of any of claims 6-8, wherein the light is reflected by the gutter by means of a second order grating.

* * * * *